Figure 1:
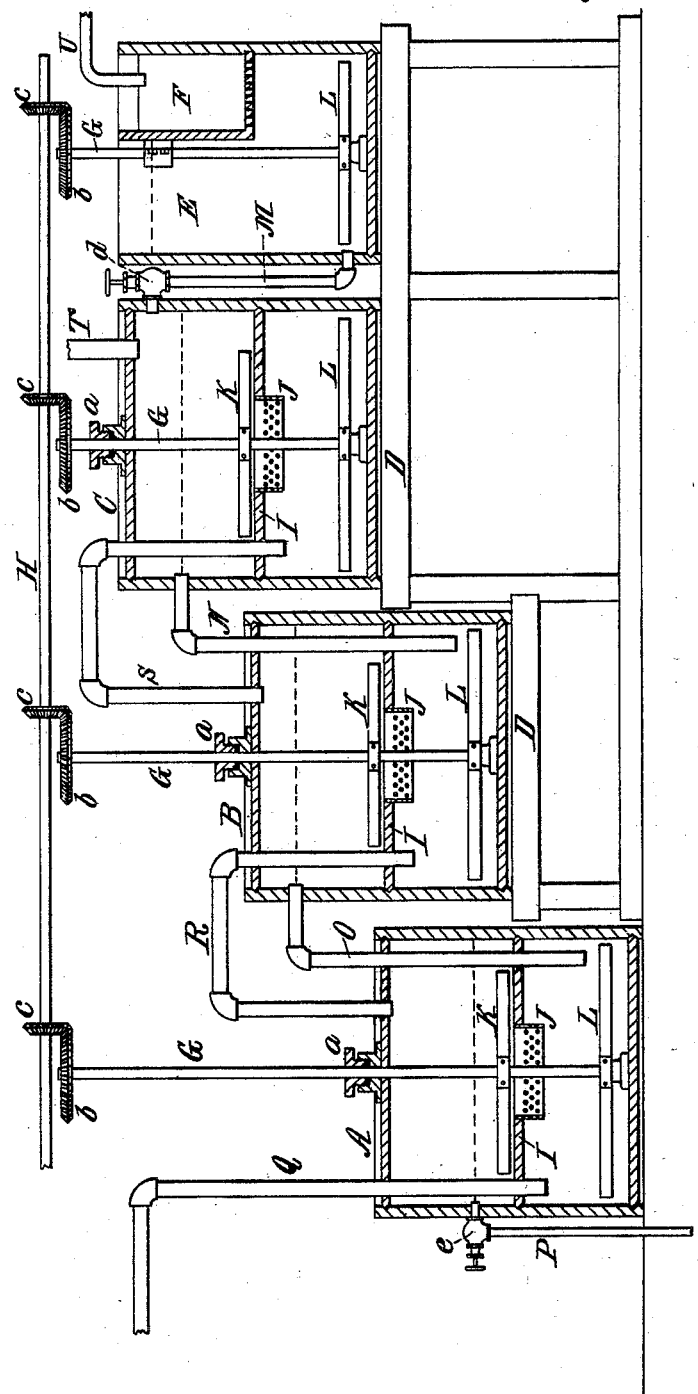

(No Model.)

C. CORNWELL.
APPARATUS FOR PRODUCING BISULPHITES.

No. 432,604. Patented July 22, 1890.

Witnesses:
W. C. Jirdinston.
Charles Billon

Inventor:
Clark Cornwell
by Peck & Rector
his Attorneys.

UNITED STATES PATENT OFFICE.

CLARK CORNWELL, OF YPSILANTI, MICHIGAN.

APPARATUS FOR PRODUCING BISULPHITES.

SPECIFICATION forming part of Letters Patent No. 432,604, dated July 22, 1890.

Application filed April 26, 1890. Serial No. 349,626. (No model.)

*To all whom it may concern:*

Be it known that I, CLARK CORNWELL, a citizen of the United States, residing at Ypsilanti, in the county of Washtenaw and State of Michigan, have invented certain new and useful Improvements in Apparatus for the Production of Solutions of Bisulphites, of which the following is a full, clear, and exact description, reference being had to the accompanying drawing, forming part of this specification.

My invention relates more particularly to apparatus for the production of solution of bisulphite of lime for use in the treatment of paper-pulp; and it has for its object the improved construction of such apparatus.

The novelty of my invention will be hereinafter set forth, and specifically pointed out in the claims.

The accompanying drawing represents in sectional elevation so much of an apparatus embodying my invention as is necessary to explain the same.

A, B, and C are three cylindrical absorption chambers or vessels made gas and water tight and arranged in steps side by side, so that C is the highest and A the lowest. Of these B and C are shown supported on a platform D of any suitable construction, and by the side of C is a fourth open-top chamber E, containing in its upper part at one side a lime-box F with a grated or perforated bottom. Centrally stepped in each of the chambers A, B, C, and E is a vertical shaft G, which is passed through a stuffing-box $a$ in the top of the chamber, excepting in the case of open-top chamber E, where the upper bearing for the shaft G may be supported by the box F. These shafts G have upon their upper ends beveled pinions $b$, meshing with other beveled pinions $c$ upon a horizontal or line shaft H.

In each of the chambers A, B, and C there is a horizontal diaphragm or division-plate I some distance above the bottom of the chamber and having a central circular opening through the same, preferably of sufficient size to permit the passage of a man's body for the purpose of cleaning out the lower part of the chamber. Fitted in each of these openings is an open-ended perforated cylinder J, made of lead or other non-corrosive material, and extending some distance below the diaphragm I.

K L are stirrer-arms secured upon the shafts G, the former just above the diaphragm I and the latter just above the bottom of the chamber.

M is a pipe leading from the lower part of the chamber E to the upper part of the chamber C and provided with a valve $d$.

N O are pipes connecting, respectively, the upper parts of chambers C and B and the lower parts of chambers B and A beneath the diaphragms I, as shown, while P is the discharge-pipe provided with a valve $e$ and extending to storage-tanks. (Not shown.)

Q is a pipe leading from a generator of sulphurous acid and opening into the chamber A just below the diaphragm I therein, while R S are pipes leading, respectively, from the tops of chambers A and B to chambers B and C, and opening into the latter beneath their diaphragms I, as shown.

The operation of the apparatus is as follows: The box F is supplied with lime, and water is admitted to the top of the box from any suitable supply-pipe U and passes down through the lime and the perforations in the bottom of the box, filling successively the chambers E, C, B, and A with a solution of lime or lime-water up to the levels shown by the dotted lines, the solution passing from one chamber to another in order through the pipes M, N, and O, as will be readily understood. The sulphurous-acid gas from the pipe Q enters the chamber A beneath the diaphragm I, and to escape into the upper part of the chamber has to pass through the perforations in the cylinder J, by which it is minutely subdivided. Inasmuch as the liquid is admitted from the pipe O into the chamber A at a point below the diaphragm and escapes therefrom through the pipe P at a point above the diaphragm, and as there are no openings in the latter, excepting the central one through the cylinder J, it has to pass up through said cylinder, through the perforations in the sides of which the gas is constantly forcing itself, and as the gas and liquid reach the top of the cylinder J they are more thoroughly mingled by the revolving stirrer K. From the chamber A the surplus gas passes through pipe R into chamber B, beneath the diaphragm I, and thence up through the perforations in the cylinder J, as before described in connection with chamber A, that which is not taken up by the liquid in chamber B passing through a pipe S into chamber C and through the perforations in the cylinder J therein to the upper part of the chamber, as in the case of chambers A and B. Any gas that remains uncombined or unabsorbed in chamber C escapes therefrom through a pipe T. The stirrers L in the lower parts of the chambers A, B, C, and E prevent the lime carried by the liquid settling to the bottoms of the chambers.

The series of chambers A, B, and C, each provided with a diaphragm I, having a central perforated cylinder J, and arranged in the order and connected together as described, form a very efficient apparatus for combining a gas passed through the apparatus in one direction with a liquid passed through it in the opposite direction, or with a base held in solution by the liquid.

My invention is not limited to the details of construction or exact arrangement of the parts shown. For instance, instead of circular central openings in the diaphragms I and perforated cylinders J, the openings may be of other suitable shape and the perforated skirt be shaped to correspond. Again, the opening may, if desired, be located at one side of the center of the diaphragm.

Having thus fully described my invention, I claim—

1. In an apparatus such as described, a chamber, as A, provided with a diaphragm I, having an opening and a pendent perforated cylinder J, an inlet for the gas below said diaphragm and an outlet for the liquid above said diaphragm, and an inlet for the liquid and an outlet for the surplus gas, substantially as and for the purpose described.

2. In an apparatus such as described, the chamber A, provided with the diaphragm I, having an opening and the pendent perforated cylinder J, in combination with the gas-inlet pipe Q and outlet-pipe R, liquid-inlet pipe O and outlet-pipe P, and the shaft G, carrying the stirrers K and L, substantially as and for the purpose described.

3. In an apparatus such as described, the chambers A, B, and C, each provided with a diaphragm I, having an opening and pendent perforated cylinder J, said chambers being arranged in the order and connected together, substantially as and for the purpose described.

4. In an apparatus such as described, the combination of the chambers A, B, and C, each provided with a diaphragm I, having an opening and pendent perforated cylinder J, the gas-inlet pipe Q, a liquid-inlet and the liquid-outlet pipe P, the connecting-pipes N O and R S, and the shafts G, carrying the stirrers K L, substantially as and for the purpose described.

5. In an apparatus such as described, the combination of the chambers A, B, and C, each provided with a diaphragm I, having a central opening and pendent perforated cylinder J, the chamber E, containing the lime-box F, the gas-inlet pipe Q and outlet T, the liquid-outlet pipe P, the connecting-pipes M N O and R S, and the shafts G, carrying the stirrers K L, substantially as and for the purpose described.

CLARK CORNWELL.

Witnesses:
FRANK JOSLYN,
W. R. COATS.